(12) United States Patent
Mizuno et al.

(10) Patent No.: US 11,766,774 B2
(45) Date of Patent: Sep. 26, 2023

(54) ENDLESS-TRACK TRAVELING APPARATUS AND TRAVELING BODY

(71) Applicant: Mitsubishi Electric Corporation, Tokyo (JP)

(72) Inventors: Daisuke Mizuno, Tokyo (JP); Yoshihiro Morimoto, Tokyo (JP); Kazuhiko Fukushima, Tokyo (JP); Naoya Kadota, Tokyo (JP); Kazuyuki Tsumagari, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 872 days.

(21) Appl. No.: 16/349,015

(22) PCT Filed: Jan. 23, 2017

(86) PCT No.: PCT/JP2017/002087
§ 371 (c)(1),
(2) Date: May 10, 2019

(87) PCT Pub. No.: WO2018/134991
PCT Pub. Date: Jul. 26, 2018

(65) Prior Publication Data
US 2019/0329399 A1 Oct. 31, 2019

(51) Int. Cl.
*B25J 5/00* (2006.01)
*B62D 55/06* (2006.01)
(Continued)

(52) U.S. Cl.
CPC .............. *B25J 5/005* (2013.01); *B62D 55/06* (2013.01); *B62D 57/024* (2013.01); *B62D 55/24* (2013.01); *B62D 55/265* (2013.01)

(58) Field of Classification Search
CPC ...... B62D 55/06; B62D 55/24; B62D 57/024; B62D 11/003; B62D 11/04; B62D 55/065; B62D 55/084; B62D 55/265; B25J 5/005
(Continued)

(56) References Cited

U.S. PATENT DOCUMENTS 1,488,629 A * 4/1924 Wick .................... B62D 55/10
180/6.7
1,591,730 A * 7/1926 Wick .................. B62D 55/0842
180/9.5
(Continued)

FOREIGN PATENT DOCUMENTS

CN 106166050 A 11/2016
EP 2781438 A1 9/2014
(Continued)

OTHER PUBLICATIONS

Office Action dated Sep. 8, 2020, issued in the corresponding Canadian Patent Application No. 3049929, 5 pages.
(Continued)

*Primary Examiner* — Anne Marie M Boehler
(74) *Attorney, Agent, or Firm* — BUCHANAN INGERSOLL & ROONEY PC

(57) ABSTRACT

There is provided a planar member having a flat portion that makes contact with the inner circumferential surface of an endless track at a position at a traveling subject side with respect to a virtual straight line that connects a vertex, at the traveling subject side, in the outer circumferential surface of a first pulley and a vertex, at the traveling subject side, in the outer circumferential surface of a second pulley.

11 Claims, 7 Drawing Sheets

(51) Int. Cl.
*B62D 57/024* (2006.01)
*B62D 55/24* (2006.01)
*B62D 55/265* (2006.01)

(58) Field of Classification Search
USPC .................................................. 305/126, 127
See application file for complete search history.

(56) References Cited

U.S. PATENT DOCUMENTS

| | | | | | |
|---|---|---|---|---|---|
| 1,987,265 | A | * | 1/1935 | Miller | B60F 1/00 305/120 |
| 2,323,526 | A | * | 7/1943 | Eliason | A63C 5/085 305/120 |
| 3,398,806 | A | * | 8/1968 | Hendricks | B62D 55/062 180/9.1 |
| 4,301,884 | A | * | 11/1981 | Taylor | B62M 27/02 180/9.58 |
| 5,487,440 | A | * | 1/1996 | Seemann | B62D 57/00 180/9.1 |
| 6,672,413 | B2 | * | 1/2004 | Moore | G01R 31/34 180/9.21 |
| 9,403,566 | B2 | * | 8/2016 | Jacobsen | B62D 59/04 |
| 9,688,326 | B2 | * | 6/2017 | Xiao | B62D 55/265 |
| 11,154,766 | B2 | * | 10/2021 | Maidment | B62D 51/04 |
| 11,319,003 | B2 | * | 5/2022 | Kadota | B62D 57/024 |
| 2008/0277172 | A1 | * | 11/2008 | Ben-Tzvi | B25J 5/005 180/9.1 |
| 2010/0231034 | A1 | | 9/2010 | Kanzler | |
| 2011/0005847 | A1 | * | 1/2011 | Andrus | F41H 11/16 180/9.1 |
| 2014/0048344 | A1 | * | 2/2014 | Canfield | B62D 55/065 180/9.5 |
| 2014/0144715 | A1 | * | 5/2014 | Albin | B62D 55/202 180/9.1 |
| 2015/0257622 | A1 | * | 9/2015 | Qian | A47L 11/4072 15/363 |
| 2016/0039483 | A1 | | 2/2016 | Nielsen et al. | |
| 2016/0240298 | A1 | * | 8/2016 | Troy | B64F 5/60 |
| 2017/0043818 | A1 | | 2/2017 | Moriguchi et al. | |
| 2018/0128879 | A1 | * | 5/2018 | Kuwahara | B25J 5/005 |
| 2019/0283820 | A1 | * | 9/2019 | Park | B62D 55/265 |
| 2020/0061884 | A1 | * | 2/2020 | Sun | B62D 55/24 |

FOREIGN PATENT DOCUMENTS

| | | |
|---|---|---|
| JP | S56-043068 A | 4/1981 |
| JP | S60110566 A | 6/1985 |
| JP | S62-168984 U | 10/1987 |
| JP | H03-279087 A | 12/1991 |
| JP | H06-144314 A | 5/1994 |
| JP | H10-044797 A | 2/1998 |
| JP | 2002046667 A | 2/2002 |
| JP | 2002046669 A | 2/2002 |
| JP | 2004-188581 A | 7/2004 |
| JP | 2004232702 A | 8/2004 |
| JP | 2005313836 A | 11/2005 |
| JP | 2010042720 A | 2/2010 |
| JP | 2010506780 A | 3/2010 |
| JP | 2014019209 A | 2/2014 |
| JP | 2015-209137 A | 11/2015 |
| JP | 2016084118 A | 5/2016 |
| JP | 2016516625 A | 6/2016 |
| JP | 2016-144982 A | 8/2016 |
| JP | 5992893 B2 | 8/2016 |
| KR | 20150143526 A | 12/2015 |

OTHER PUBLICATIONS

Extended European Search Report dated Sep. 8, 2020 for the corresponding European patent application No. 20183841.4, 9 pages.
Extended European Search Report dated Sep. 8, 2020 for the corresponding European patent application No. 20183847.1, 8 pages.
Office Action dated Feb. 21, 2021 issued in corresponding Korean Patent Application No. 10-2019-7012831, with English translation (9 pages).
International Search Report (PCT/ISA/210) dated Mar. 7, 2017, by the Japan Patent Office as the International Searching Authority for International Application No. PCT/JP2017/002087.
Written Opinion (PCT/ISA/237) dated Mar. 7, 2017, by the Japan Patent Office as the International Searching Authority for International Application No. PCT/JP2017/002087.
Extended European Search Report dated Dec. 19, 2019 for corresponding European patent application No. 17892190.4, 8 pages.
Office Action dated Jul. 29, 2021, in corresponding Chinese Patent Application No. 201780083791.0 and English translation of the Office Action. (15 pages).
Office Action (Notice of Reasons for Refusal) dated Jun. 12, 2018, by the Japan Patent Office in Japanese Patent Application No. 2018-029413 and English translation of the Office Action. (8 pages).
Office Action (Notice of Reasons for Refusal) dated Jun. 12, 2018, by the Japan Patent Office in Japanese Patent Application No. 2018-029414 and English translation of the Office Action. (8 pages).
Office Action dated Dec. 1, 2021, in corresponding Chinese Patent Application No. 201780083791.0 and English translation of the Office Action. (15 pages).
Office Action dated Jul. 1, 2020, issued in corresponding European Patent Application No. 17892190.4, 6 pages.
Office Action dated Jan. 15, 2021, issued in corresponding Chinese Patent Application No. 201780083791.0, 17 pages including 9 pages of English translation.
Office Action dated Jun. 3, 2020, issued in corresponding Korean Patent Application No. 10-2019-7012831, 18 pages including 9 pages of English translation.
Communication pursuant to Article 94(3) EPC dated May 2, 2022, issued in the corresponding European Patent Application No. 17892190. 4, 7 pages.
Office Action issued in corresponding Chinese patent Application No. 202110567174.6, dated Nov. 14, 2022, 14 pages including 5 pages of English Translation.
Office Action issued in corresponding Chinese Patent Application No. 202110567168.0, dated Jan. 20, 2023, 17 pages including 7 pages of English translation.

* cited by examiner

ENDLESS-TRACK TRAVELING APPARATUS AND TRAVELING BODY

TECHNICAL FIELD

The present invention relates to an endless-track traveling apparatus utilizing an endless track such as a crawler belt and to a traveling body such as an inspection robot provided with the endless-track traveling apparatus.

BACKGROUND ART

As is well known, as a traveling apparatus that makes a traveling body such as an inspection robot travel by use of rotation torque of a driving apparatus such as a motor, there exist a wheel-traveling type in which a wheel is made to make contact with a road surface or the like so that a traveling body is made to travel and an endless-track traveling type in which an endless track formed of a crawler belt or a caterpillar is made to make contact with a road surface or an apparatus to be inspected so that a traveling body is made to travel.

In the case of the wheel-traveling type in which a wheel is made to make contact with a road surface or the like so that traveling is performed, there exist, for example, a four-wheel independent driving type in which in order to make a traveling body such as a robot stably travel in a level difference or the like on a travel surface, all of four wheels that are provided at the front and rear sides of the traveling body are driven by respective independent driving power sources and a front-and-rear wheels synchronous driving type in which respective timing pulleys are provided on the front and rear wheels of a traveling body and a timing belt is mounted across the front and rear timing pulleys so that the front and rear wheels are driven in synchronization with each other (For example, refer to Patent Document 1).

In addition, there has been proposed a traveling apparatus in which as a traveling body for traveling through a narrow gap, the wheel-traveling type is utilized, two or more wheels are arranged at the front and rear sides of the traveling body in such a way that each one of the wheels is in series with one another, the width of the traveling body is as large as the width of the wheel, and an apparatus such as a control box provided with a control board is mounted in a space existing between the front and rear wheels (for example, refer to Patent Document 2).

Furthermore, in the endless-track traveling type, there has been proposed a traveling apparatus in which a negative pressure is made to occur in a decompression chamber of a traveling body and hence a crawler belt made of a flexible member, wound over the front and rear pulleys, is pressed to the wall face so that traveling is performed (for example, refer to Patent Document 3). In addition, in the endless-track traveling type, there has been proposed a mechanism in which the respective tread faces of crawler shoes arranged along a crawler belt are prevented from being folded in a valley manner (for example, refer to Patent Document 4).

PRIOR ART REFERENCE

Patent Document

[Patent Document 1] Japanese Patent Application Laid-Open No. 2004-232702
[Patent Document 2] Japanese Patent Publication No. 5992893
[Patent Document 3] Japanese Patent Application Laid-Open No. 2016-084118
[Patent Document 4] Japanese Patent Application Laid-Open No. 2002-46667

DISCLOSURE OF THE INVENTION

Problems to be Solved by the Invention

In the case of the conventional traveling apparatus disclosed in Patent Document 1, in order to travel through a narrow gap, an apparatus such as a control box is disposed between the front and rear wheels so that the thickness thereof is reduced; however, due to a recess or a protrusion existing in a traveling surface, the bottom plain of the main body of the traveling apparatus makes contact with the traveling surface during traveling and hence the traveling apparatus may become unable to travel or a large vibration may occur in the traveling apparatus. In order to solve these problems, it is desired to increase the diameter of the wheel; however, when the diameter of the wheel is increased, the traveling apparatus becomes larger as a whole and hence it becomes difficult to reduce the thickness thereof.

In the case of the endless-track traveling type utilizing a crawler belt, in order to travel stably, it is required that the portion, of the crawler belt, that should make contact with a traveling surface is pressed to the traveling surface by at least three pulleys; thus, the number of components such as a pulley and the like increases and the traveling apparatus is upsized inevitably.

The present invention has been implemented in order to solve the foregoing problems in conventional traveling apparatuses; the objective thereof is to provide an endless-track traveling apparatus that can be downsized and can stably travel.

In addition, the objective of the present invention is to provide a traveling body such as an inspection robot that can be downsized and can stably travel.

Means for Solving the Problems

An endless-track traveling apparatus according to the present invention includes
a first pulley and a second pulley that are arranged in such a way that the respective center axes thereof are in parallel with each other,
a motor that drives at least one of the first pulley and the second pulley, and
an endless track that is wound over an outer circumferential surface of the first pulley and an outer circumferential surface of the second pulley, that is driven by the at least one of the pulleys rotated by being driven by the motor, and that travels over the first pulley and the second pulley; an outer circumferential surface of the endless track makes contact with a traveling subject so that based on the travel of the endless track, the endless-track traveling apparatus travels on the traveling subject; the endless-track traveling apparatus is characterized
in that there is provided a planar member that is disposed in a space surrounded by the endless track and has a flat portion that makes contact with an inner circumferential surface of at least one of two portions, of the endless track existing between the first pulley and the second pulley, that face each other,
in that the flat portion of the planar member makes contact with the inner circumferential surface of the endless track at a position at the traveling subject side with respect to a virtual straight line that connects a vertex, at the traveling subject side, in the outer circumferential surface of the first pulley and a vertex, at the traveling subject side, in the outer circumferential surface of the second pulley, and in that at least part of the outer circumferential surface, of the endless track, that faces the inner circumferential surface being in contact with the flat portion of the planar member makes contact with the traveling subject.

An endless-track traveling apparatus according to the present invention includes a first pulley and a second pulley that are arranged in such a way that the respective center axes thereof are in parallel with each other, a motor that drives at least one of the first pulley and the second pulley, and an endless track that is wound over an outer circumferential surface of the first pulley and an outer circumferential surface of the second pulley, that is driven by the at least one of the pulleys rotated by being driven by the motor, and that travels over the first pulley and the second pulley; an outer circumferential surface of the endless track makes contact with a traveling subject so that based on the travel of the endless track, the endless-track traveling apparatus travels on the traveling subject; the endless-track traveling apparatus is characterized in that there are provided a first planar member that is disposed in a space surrounded by the endless track and has a flat portion that makes contact with an inner circumferential surface of one of two portions, of the endless track existing between the first pulley and the second pulley, that face each other, and a second planar member that is disposed in the space surrounded by the endless track and has a flat portion that makes contact with an inner circumferential surface of the other one of two portions, of the endless track existing between the first pulley and the second pulley, that face each other, in that the flat portion of the first planar member makes contact with the inner circumferential surface of the one of two portions of the endless track at a position apart from a virtual straight line, in a direction departing from the space surrounded by the endless track, that connects a vertex, at the side of the one of two portions of the endless track, in the outer circumferential surface of the first pulley and a vertex, at the side of the one of two portions of the endless track, in the outer circumferential surface of the second pulley, in that the flat portion of the second planar member makes contact with the inner circumferential surface of the other one of two portions of the endless track at a position apart from a virtual straight line, in a direction departing from the space surrounded by the endless track, that connects a vertex, at the side of the other one of two portions of the endless track, in the outer circumferential surface of the first pulley and a vertex, at the side of the other one of two portions of the endless track, in the outer circumferential surface of the second pulley, and in that the endless track is configured in such a way that the traveling subject makes contact with at least one of at least part of the outer circumferential surface that faces the inner circumferential surface, being in contact with the flat portion of the first planar member, of the one of two portions of the endless track and at least part of the outer circumferential surface that faces the inner circumferential surface, being in contact with the flat portion of the second planar member, of the other one of two portions of the endless track.

Moreover, a traveling body according to the present invention includes a first endless-track traveling apparatus and a second endless-track traveling apparatus that are arranged in parallel with each other in a direction perpendicular to a traveling direction, an apparatus mounting unit that is disposed between the first endless-track traveling apparatus and the second endless-track traveling apparatus and is equipped with an inspection apparatus, and a coupling member that couples the apparatus mounting unit with each one of the first endless-track traveling apparatus and the second endless-track traveling apparatus; each of the first control unit and the second control unit has a first pulley and a second pulley that are arranged in such a way that the respective center axes thereof are in parallel with each other, a motor that drives at least one of the first pulley and the second pulley, and an endless track that is wound over an outer circumferential surface of the first pulley and an outer circumferential surface of the second pulley, that is driven by the at least one of the pulleys rotated by being driven by the motor, and that travels over the first pulley and the second pulley; an outer circumferential surface of the endless track makes contact with a traveling subject so that based on the travel of the endless track, the traveling body travels on the traveling subject; the traveling body is characterized in that there is provided a planar member that is disposed in a space surrounded by the endless track and has a flat portion that makes contact with an inner circumferential surface of at least one of two portions, of the endless track existing between the first pulley and the second pulley, that face each other, in that the flat portion of the planar member makes contact with the inner circumferential surface of the endless track at a position at the traveling subject side with respect to a virtual straight line that connects a vertex, at the traveling subject side, in the outer circumferential surface of the first pulley and a vertex, at the traveling subject side, in the outer circumferential surface of the second pulley, and in that at least part of the outer circumferential surface, of the endless track, that faces the inner circumferential surface being in contact with the flat portion of the planar member makes contact with the traveling subject.

Furthermore, a traveling body according to the present invention includes a first endless-track traveling apparatus and a second endless-track traveling apparatus that are arranged in parallel with each other in a direction perpendicular to a traveling direction, an apparatus mounting unit that is disposed between the first endless-track traveling apparatus and the second endless-track traveling apparatus and is equipped with an inspection apparatus, and a coupling member that couples the apparatus mounting unit with each one of the first endless-track traveling apparatus and the second endless-track traveling apparatus; each of the first control unit and the second control unit has a first pulley and a second pulley that are arranged in such a way that the respective center axes thereof are in parallel with each other, a motor that drives at least one of the first pulley and the second pulley, and an endless track that is wound over an outer circumferential surface of the first pulley and an outer circumferential surface of the second pulley, that is driven by the at least one of the pulleys rotated by being driven by the motor, and that travels over the first pulley and the second pulley; an outer circumferential surface of the endless track makes contact with a traveling subject so that based on the travel of the endless track, the traveling body travels on the traveling subject; the traveling body is characterized in that there are provided a first planar member that is disposed in a space surrounded by the endless track and has a flat portion that makes contact with an inner circumferential surface of one of two portions, of the endless track existing between the first pulley and the second pulley, that face each other, and a second planar member that is disposed in the space surrounded by the endless track and has a flat portion that makes contact with an inner circumferential surface of the other one of two portions, of the endless track existing between the first pulley and the second pulley, that face each other, in that the flat portion of the first planar member makes contact with the inner circumferential surface of the one of two portions of the endless track at a position apart from a virtual straight line, in a direction departing from the space surrounded by the endless track, that connects a vertex, at the side of the one of two portions of the endless track, in the outer circumferential surface of the first pulley and a vertex, at the side of the one of two portions of the endless track, in the outer circumferential surface of the second pulley, in that the flat portion of the second planar member makes contact with the inner circumferential surface of the other one of two portions of the endless track at a position apart from a virtual straight line, in a direction departing from the space surrounded by the endless track, that connects a vertex, at the side of the other one of two portions of the endless track, in the outer circumferential surface of the first pulley and a vertex, at the side of the other one of two portions of the endless track, in the outer circumferential surface of the second pulley, and in that the endless track is configured in such a way that the traveling subject makes contact with at least one of at least part of the outer circumferential surface that faces the inner circumferential surface, being in contact with the flat portion of the first planar member, of the one of two portions of the endless track and at least part of the outer circumferential surface that faces the inner circumferential surface, being in contact with the flat portion of the second planar member, of the other one of two portions of the endless track.

Advantage of the Invention

In an endless-track traveling apparatus according to the present invention, there is provided a planar member that is disposed in a space surrounded by the endless track and has a flat portion that makes contact with an inner circumferential surface of at least one of two portions, of the endless track existing between the first pulley and the second pulley, that face each other; the flat portion of the planar member makes contact with the inner circumferential surface of the endless track at a position at the traveling subject side with respect to a virtual straight line that connects a vertex, at the traveling subject side, in the outer circumferential surface of the first pulley and a vertex, at the traveling subject side, in the outer circumferential surface of the second pulley; at least part of the outer circumferential surface, of the endless track, that faces the inner circumferential surface being in contact with the flat portion of the planar member makes contact with the traveling subject. As a result, the endless-track traveling apparatus can be downsized and thinned; on top of that, even when there is an obstacle caused by a groove or the like existing in the traveling subject, the endless-track traveling apparatus can suppress vibration so as to travel smoothly.

Moreover, in an endless-track traveling apparatus according to the present invention, there are provided a first planar member that is disposed in a space surrounded by the endless track and has a flat portion that makes contact with an inner circumferential surface of one of two portions, of the endless track existing between the first pulley and the second pulley, that face each other, and a second planar member that is disposed in the space surrounded by the endless track and has a flat portion that makes contact with an inner circumferential surface of the other one of two portions, of the endless track existing between the first pulley and the second pulley, that face each other; the flat portion of the first planar member makes contact with the inner circumferential surface of the one of two portions of the endless track at a position apart from a virtual straight line, in a direction departing from the space surrounded by the endless track, that connects a vertex, at the side of the one of two portions of the endless track, in the outer circumferential surface of the first pulley and a vertex, at the side of the one of two portions of the endless track, in the outer circumferential surface of the second pulley; the flat portion of the second planar member makes contact with the inner circumferential surface of the other one of two portions of the endless track at a position apart from a virtual straight line, in a direction departing from the space surrounded by the endless track, that connects a vertex, at the side of the other one of two portions of the endless track, in the outer circumferential surface of the first pulley and a vertex, at the side of the other one of two portions of the endless track, in the outer circumferential surface of the second pulley; the endless track is configured in such a way that the traveling subject makes contact with at least one of at least part of the outer circumferential surface that faces the inner circumferential surface, being in contact with the flat portion of the first planar member, of the one of two portions of the endless track and at least part of the outer circumferential surface that faces the inner circumferential surface, being in contact with the flat portion of the second planar member, of the other one of two portions of the endless track. Therefore, at least one of two portions, of the endless track existing between the first pulley and the second pulley, that face each other makes contact with the traveling subject so that the endless-track traveling apparatus can travel; not only one but also both of the two portions of the endless track are utilized so that the endless-track traveling apparatus can travel, as occasion may demand; on top of that, the endless-track traveling apparatus can be downsized and thinned; furthermore, even when there is an obstacle caused by a groove or the like existing in the traveling subject, the endless-track traveling apparatus can suppress vibration so as to travel smoothly.

Moreover, in a traveling body according to the present invention, there are provided a first endless-track traveling apparatus and a second endless-track traveling apparatus that are arranged in parallel with each other in a direction perpendicular to a traveling direction, an apparatus mounting unit that is disposed between the first endless-track traveling apparatus and the second endless-track traveling apparatus and is equipped with an inspection apparatus, and a coupling member that couples the apparatus mounting unit with each one of the first endless-track traveling apparatus and the second endless-track traveling apparatus; each of the first control unit and the second control unit has a first pulley and a second pulley that are arranged in such a way that the respective center axes thereof are in parallel with each other, a motor that drives at least one of the first pulley and the second pulley, and an endless track that is wound over an outer circumferential surface of the first pulley and an outer circumferential surface of the second pulley, that is driven by the at least one of the pulleys rotated by being driven by the motor, and that travels over the first pulley and the second pulley; an outer circumferential surface of the endless track makes contact with a traveling subject so that based on the travel of the endless track, the traveling body travels on the traveling subject; there is provided a planar member that is disposed in a space surrounded by the endless track and has a flat portion that makes contact with an inner circumferential surface of at least one of two portions, of the endless track existing between the first pulley and the second pulley, that face each other; the flat portion of the planar member makes contact with the inner circumferential surface of the endless track at a position at the traveling subject side with respect to a virtual straight line that connects a vertex, at the traveling subject side, in the outer circumferential surface of the first pulley and a vertex, at the traveling subject side, in the outer circumferential surface of the second pulley; at least part of the outer circumferential surface, of the endless track, that faces the inner circumferential surface being in contact with the flat portion of the planar member makes contact with the traveling subject. As a result, the traveling body can be downsized and thinned; on top of that, even when there is an obstacle caused by a groove or the like existing in the traveling subject, the traveling body can suppress vibration so as to travel smoothly and hence can be utilized as an inspection robot for an electric power generator.

Furthermore, in a traveling body according to the present invention, there are provided a first endless-track traveling apparatus and a second endless-track traveling apparatus that are arranged in parallel with each other in a direction perpendicular to a traveling direction, an apparatus mounting unit that is disposed between the first endless-track traveling apparatus and the second endless-track traveling apparatus and is equipped with an inspection apparatus, and a coupling member that couples the apparatus mounting unit with each one of the first endless-track traveling apparatus and the second endless-track traveling apparatus; each of the first control unit and the second control unit has a first pulley and a second pulley that are arranged in such a way that the respective center axes thereof are in parallel with each other, a motor that drives at least one of the first pulley and the second pulley, and an endless track that is wound over an outer circumferential surface of the first pulley and an outer circumferential surface of the second pulley, that is driven by the at least one of the pulleys rotated by being driven by the motor, and that travels over the first pulley and the second pulley; an outer circumferential surface of the endless track makes contact with a traveling subject so that based on the travel of the endless track, the traveling body travels on the traveling subject; there are provided a first planar member that is disposed in a space surrounded by the endless track and has a flat portion that makes contact with an inner circumferential surface of one of two portions, of the endless track existing between the first pulley and the second pulley, that face each other, and a second planar member that is disposed in the space surrounded by the endless track and has a flat portion that makes contact with an inner circumferential surface of the other one of two portions, of the endless track existing between the first pulley and the second pulley, that face each other; the flat portion of the first planar member makes contact with the inner circumferential surface of the one of two portions of the endless track at a position apart from a virtual straight line, in a direction departing from the space surrounded by the endless track, that connects a vertex, at the side of the one of two portions of the endless track, in the outer circumferential surface of the first pulley and a vertex, at the side of the one of two portions of the endless track, in the outer circumferential surface of the second pulley; the flat portion of the second planar member makes contact with the inner circumferential surface of the other one of two portions of the endless track at a position apart from a virtual straight line, in a direction departing from the space surrounded by the endless track, that connects a vertex, at the side of the other one of two portions of the endless track, in the outer circumferential surface of the first pulley and a vertex, at the side of the other one of two portions of the endless track, in the outer circumferential surface of the second pulley; the endless track is configured in such a way that the traveling subject makes contact with at least one of at least part of the outer circumferential surface that faces the inner circumferential surface, being in contact with the flat portion of the first planar member, of the one of two portions of the endless track and at least part of the outer circumferential surface that faces the inner circumferential surface, being in contact with the flat portion of the second planar member, of the other one of two portions of the endless track. Therefore, at least one of two portions, of the endless track existing between the first pulley and the second pulley, that face each other makes contact with the traveling subject so that the endless-track traveling apparatus can travel; not only one but also both of the two portions of the endless track are utilized so that the endless-track traveling apparatus can travel, as occasion may demand; on top of that, the traveling body can be downsized and thinned; moreover, even when there is an obstacle caused by a groove or the like existing in the traveling subject, the traveling body can suppress vibration so as to travel smoothly and hence can be utilized as an inspection robot for an electric power generator.

BEST MODE FOR CARRYING OUT THE INVENTION

Embodiment 1

Figure 1:
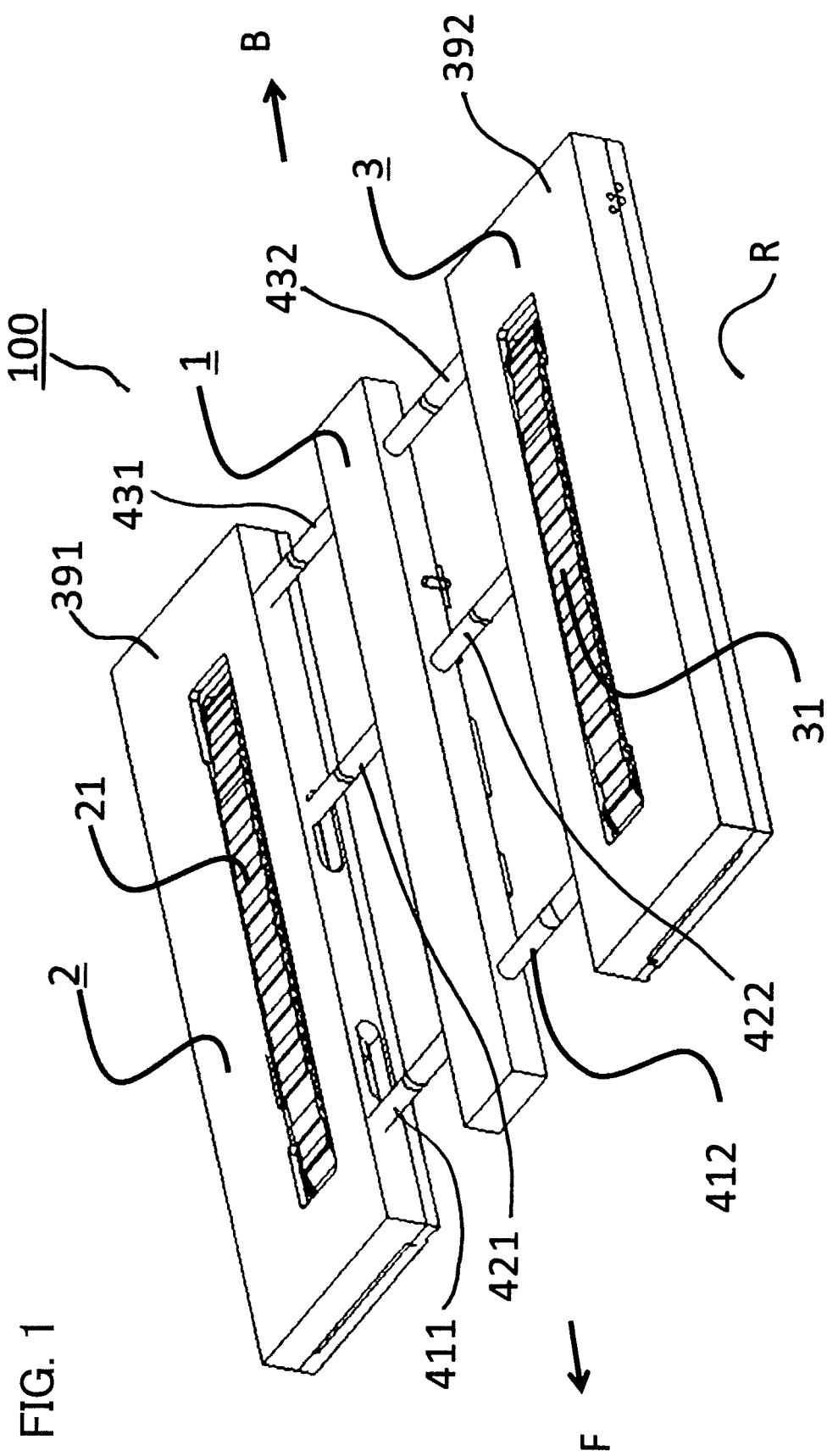
FIG. 1 is a perspective view illustrating the overall configuration of a traveling body provided with an endless-track traveling apparatus according to Embodiment 1 of the present invention.

FIG. 1 is a perspective view illustrating the overall configuration of a traveling body provided with an endless-track traveling apparatus according to Embodiment 1 of the present invention. A traveling body 100, illustrated in FIG. 1, that is provided with an endless-track traveling apparatus according to Embodiment 1 is configured as an inspection robot for a large-size electric power generator. In FIG. 1, the traveling body 100 configured as an inspection robot for an electric power generator includes a sensor mounting unit 1, as an apparatus mounting unit, that is equipped with a sensor, a camera, and the like for inspection, a first endless-track traveling apparatus 2 equipped with a crawler belt 21 as an endless track, and a second endless-track traveling apparatus 3 equipped with a crawler belt 31.

As illustrated in FIG. 1, the first endless-track traveling apparatus 2, the second endless-track traveling apparatus 3, and the sensor mounting unit 1 are arranged in parallel with one another in a direction substantially perpendicular to a forward direction F and a backward direction B of the traveling body 100. First coupling members 411, 421, and 431 are arranged between a sidewall portion of a base portion 39 in the first endless-track traveling apparatus 2 and one of the sidewall portions of a case 11 of the sensor mounting unit 1 so as to mechanically couple the first endless-track traveling apparatus 2 and the sensor mounting unit 1.

Second coupling members 412, 422, and 432 are arranged between a sidewall portion of a base portion 39 in the second endless-track traveling apparatus 3 and the other one of the sidewall portions of the case 11 of the sensor mounting unit 1 so as to mechanically couple the second endless-track traveling apparatus 3 and the sensor mounting unit 1.

Each of the first coupling members 411, 421, and 431 and the second coupling members 412, 422, and 432 can bend at the substantially central portion in its longitudinal direction.

The sensor mounting unit 1 is supported by the first endless-track traveling apparatus 2 through the intermediary of the first coupling members 411, 421, and 431 and is supported by the second endless-track traveling apparatus 3 through the intermediary of the second coupling members 412, 422, and 432; the bottom plain of the sensor mounting unit 1 faces a traveling surface R via a gap. The first endless-track traveling apparatus 2 and the second endless-track traveling apparatus 3 are configured in such a way as to be in linearly symmetrical with each other with respect to the forward direction F and the backward direction B; each one thereof forms the endless-track traveling apparatus according to Embodiment 1 of the present invention.

The traveling body 100, configured in such a way as described above, advances straight in the forward direction F or in the backward direction B by rotating the crawler belt 21, as an endless track, of the first endless-track traveling apparatus 2 and the crawler belt 31, as an endless track, of the second endless-track traveling apparatus 3 at the same rotation speed and in the same direction.

The respective rotation directions of the crawler belt 21 of the first endless-track traveling apparatus 2 and the crawler belt 31 of the second endless-track traveling apparatus 3 are set to be opposite to each other so that turning operation is performed; the respective rotation directions thereof are set to be the same as each other and the respective rotation speeds thereof are set to be different from each other so that clockwise traveling or anticlockwise traveling can be performed. For example, in the case where while traveling in the forward direction F is performed, the rotation speed of the crawler belt 21 of the first endless-track traveling apparatus 2 is made to be lower than the rotation speed of the crawler belt 31 of the second endless-track traveling apparatus 3, clockwise traveling can be performed; in the case where the rotation speed of the crawler belt 31 of the second endless-track traveling apparatus 3 is made to be lower than the rotation speed of the crawler belt 21 of the first endless-track traveling apparatus 2, anticlockwise traveling can be performed.

Figure 2:
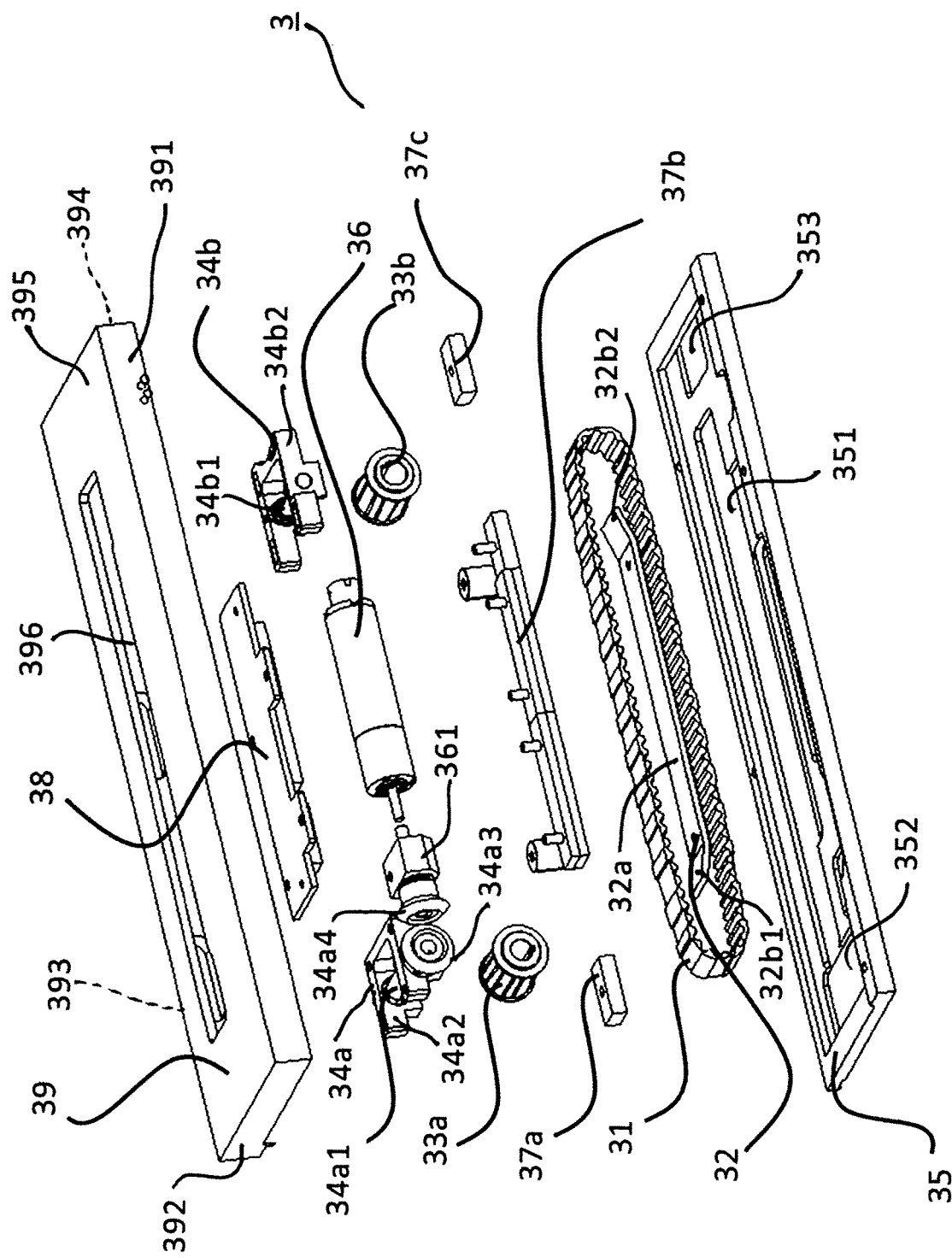
FIG. 2 is an exploded perspective view of the endless-track traveling apparatus according to Embodiment 1 of the present invention.

Next, the endless-track traveling apparatus according to Embodiment 1 of the present invention will be explained in detail. FIG. 2 is an exploded perspective view of the endless-track traveling apparatus according to Embodiment 1 of the present invention and corresponds to the second endless-track traveling apparatus 3 in FIG. 1. As described above, the first endless-track traveling apparatus 2 and the second endless-track traveling apparatus 3 in FIG. 1 are configured in such a way as to be in linearly symmetrical with each other with respect to the forward direction F and the backward direction B; however, because each of the first endless-track traveling apparatus 2 and the second endless-track traveling apparatus 3 is configured substantially in the same manner, the second endless-track traveling apparatus 3 will be explained here.

In FIG. 2, the second endless-track traveling apparatus 3 is provided with the base portion 39 and a covering portion 35. The base portion 39 is provided with a top portion 395 and side portions 391, 392, 393, and 394 that each extend downward from the respective edges at the four ends of the top portion 395. The covering portion 35 makes contact with the respective endfaces of the side portions 391, 392, 393, and 394 of the base portion 39 so as to cover the bottom portion of the base portion 39.

In the top portion 395 of the base portion 39, there is formed a rectangular through-hole 396 for exposing one of the portions (the upper portion in FIG. 2), of the crawler belt 31, that face each other to the outside from the base portion 39. In the covering portion 35, there are formed a rectangular through-hole 351 for exposing the other one of the portions (the lower portion in FIG. 2), of the crawler belt 31, that face each other from the covering portion 35, a through-hole 351 for exposing an after-mentioned permanent magnet 37a, and a through-hole 353 for exposing an after-mentioned permanent magnet 37c.

A driving-side pulley axle unit 34a is provided with a driving-side pulley axle 34a1 that supports a driving-side pulley 33a as a first pulley, a driving-side pulley axle holding body 34a2 that pivotably holds the driving-side pulley axle 34a1, and a bevel gear 34a3 fixed on the driving-side pulley axle 34a1. The driving-side pulley axle 34a1 of the driving-side pulley axle unit 34a is inserted into the central through-hole of the driving-side pulley 33a that is fixed on the driving-side pulley axle 34a1 in such a way as to rotate integrally with the driving-side pulley axle 34a1.

A driven-side pulley axle unit 34*b* is provided with a driven-side pulley axle 34*b*1 that supports a driven-side pulley 33*b*, as a second pulley, and a driven-side pulley axle holding body 34*b*2 that holds the driven-side pulley axle 34*b*1. The driven-side pulley axle 34*b*1 of the driven-side pulley axle unit 34*b* is inserted into the central through-hole of the driven-side pulley 33*b* that is pivotably held by the driven-side pulley axle holding body 34*b*2, through the intermediary of the driven-side pulley axle 34*b*1.

A motor 36 fixed to the base portion 39 drives a bevel gear 34*a*4, through the intermediary of a speed reducing mechanism 361. The bevel gear 34*a*4 is engaged with the foregoing bevel gear 34*a*3; the bevel gear 34*a*4 drives and rotates the driving-side pulley 33*a*, through the intermediary of the bevel gear 34*a*3 and the driving-side pulley axle 34*a*1. A control board 38 equipped with a control circuit for controlling the motor 36 and the like is fixed inside the base portion 39.

The crawler belt 31 that is made of rubber and forms an endless track is wound over an outer circumferential surface 33*a*1 of the driving-side pulley 33*a* and an outer circumferential surface 33*b*1 of the driven-side pulley 33*b*; while the driven-side pulley 33*b* is rotated by rotation of the driving-side pulley 33*a*, the crawler belt 31 travels over the driving-side pulley 33*a* and the driven-side pulley 33*b*.

Figure 5:
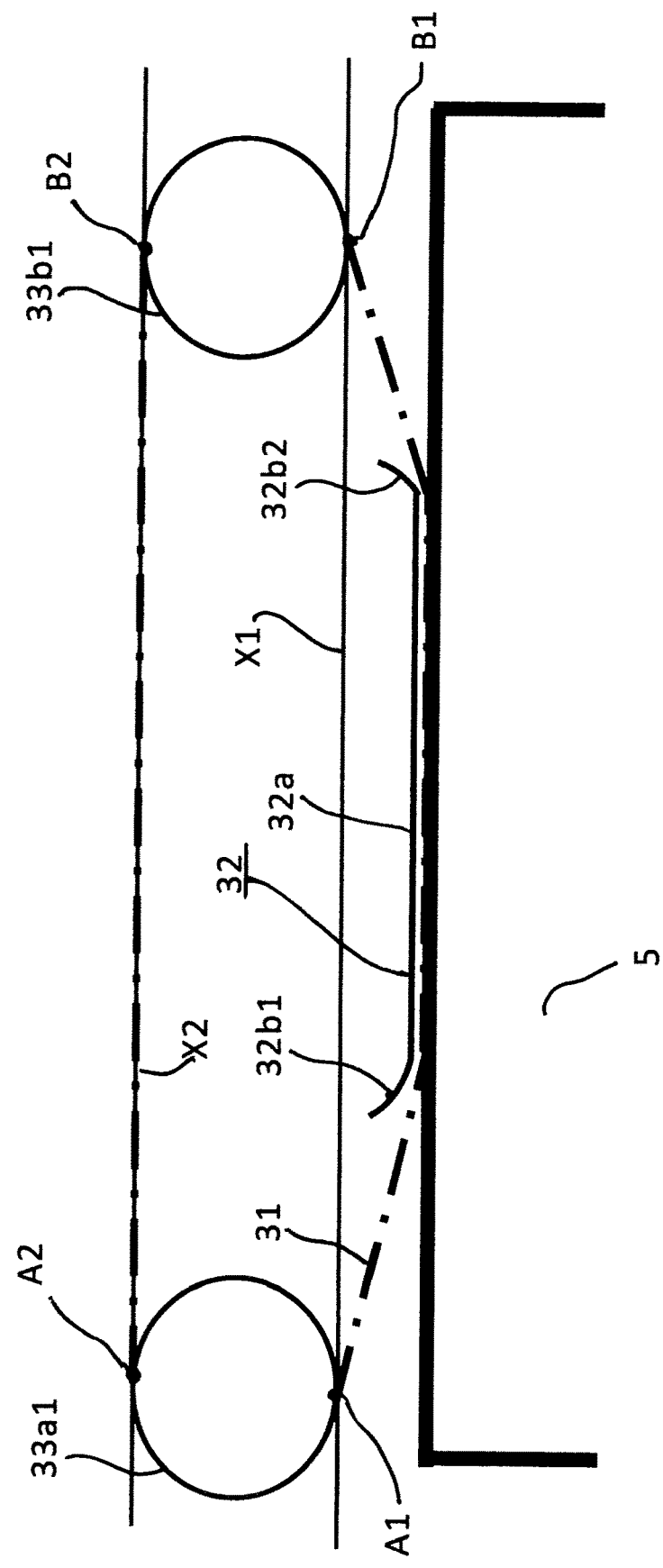
FIG. 5 is an explanatory view of the endless-track traveling apparatus according to Embodiment 1 of the present invention.

FIG. 5 is an explanatory view of the endless-track traveling apparatus according to Embodiment 1 of the present invention. In FIGS. 2 and 5, a planar member 32 is disposed in the space surrounded by the crawler belt 31 as an endless track. The planar member 32 has a flat portion 32*a* that makes contact with the inner circumferential surface of one of the two portions (the lower portion in each of FIGS. 2 and 5), of the crawler belt 31 existing between the driving-side pulley 33*a* and the driven-side pulley 33*b*, that face each other.

The flat portion 32*a* of the planar member 32 makes contact with the inner circumferential surface of the crawler belt 31 at a position at a traveling subject 5 side with respect to a virtual straight line X1 that connects a vertex A1, at the traveling subject 5 (e.g., a traveling surface) side, in the outer circumferential surface 33*a*1 of the driving-side pulley 33*a* and a vertex B1, at the traveling subject 5 side, in the outer circumferential surface 33*b*1 of the driven-side pulley 33*b*. Accordingly, the crawler belt 31 is pressed from the inside to the outside by the planar member 32 and is exposed to the outside through the through-hole 351 provided in the covering portion 35 so as to make contact with the traveling subject 5.

The planar member 32 disposed inside the crawler belt 31 is provided with the flat portion 32*a* that makes contact with the inner circumferential surface of the driving-side pulley 33*a*, a first inclination portion 32*b*1 connected with one of the end portions of the flat portion 32*a*, and a second inclination portion 32*b*2 connected with the other one of the end portions of the flat portion 32*a*. The first inclination portion 32*b*1 is formed in such a way that the distance between the first inclination portion 32*b*1 and the inner circumferential surface of the crawler belt 31 becomes larger as the first inclination portion 32*b*1 approaches the driving-side pulley 33*a* more. The second inclination portion 32*b*2 is formed in such a way that the distance between the second inclination portion 32*b*2 and the inner circumferential surface of the crawler belt 31 becomes larger as the second inclination portion 32*b*2 approaches the driven-side pulley 33*b* more.

In FIG. 2, the permanent magnet 37*a* is fixed inside the base portion 39 and is disposed in such a way as to be exposed to the outside of the covering portion 35 through the through-hole 352 provided in the covering portion 35. Similarly, the permanent magnet 37*c* is fixed inside the base portion 39 and is disposed in such a way as to be exposed to the outside of the covering portion 35 through the through-hole 353 provided in the covering portion 35. A permanent magnet 37*b* is fixed to the flat portion 32*a* of the planar member 32 and is disposed inside the crawler belt 31.

Figure 3:
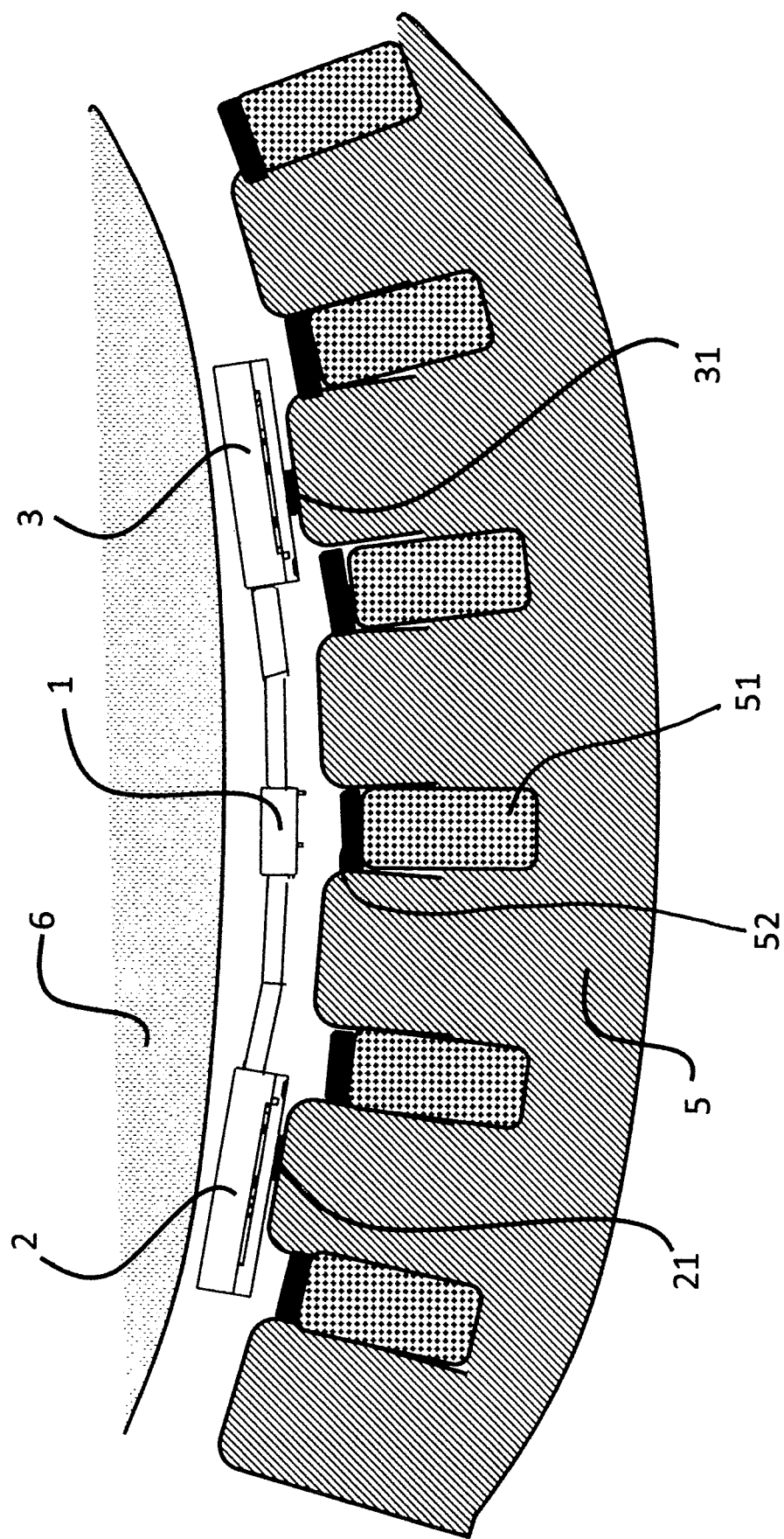
FIG. 3 is an explanatory view illustrating a usage state of a traveling body provided with the endless-track traveling apparatus according to Embodiment 1 of the present invention.

Next, there will be explained the operation of the traveling body 100 provided with the first endless-track traveling apparatus 2 and the second endless-track traveling apparatus 3, which are each configured in such a manner as described above, at a time when the traveling body 100 is configured as an inspection robot for an electric power generator. The traveling body 100 travels through a gap between the rotor and the stator core of the electric power generator so as to perform inspection of the electric power generator. FIG. 3 is an explanatory view illustrating a usage state of a traveling body provided with the endless-track traveling apparatus according to Embodiment 1 of the present invention.

In FIGS. 2 and 3, the traveling body 100 inserted into the space between a rotor 6 and a stator core 5 of the electric power generator travels in the axle direction of the electric power generator, by means of the first endless-track traveling apparatus 2 and the second endless-track traveling apparatus 3, and performs inspection of the inside of the electric power generator by use of various kinds of sensors and a camera mounted in the sensor mounting unit 1. The permanent magnets 37*a*, 37*b*, 37*c* provided inside the first endless-track traveling apparatus 2 and the permanent magnets 37*a*, 37*b*, 37*c* provided inside the second endless-track traveling apparatus 3 are attracted by the stator core 5 as the traveling subject formed of a magnetic material; as a result, each of the first endless-track traveling apparatus 2 and the second endless-track traveling apparatus 3 can travel while adhering to the stator core 5 as the traveling subject, without dropping at any position in the circumferential direction of the electric power generator.

In this situation, the permanent magnets 37*a*, 37*b*, 37*c* provided in the first endless-track traveling apparatus 2 and the permanent magnets 37*a*, 37*b*, 37*c* provided in the second endless-track traveling apparatus 3 are attracted by the stator core 5, without making contact with the stator core 5. Because the permanent magnet 37*b* is attracted by the stator core 5, each of the crawler belts 21 and 31 provided in the first endless-track traveling apparatus 2 and the second endless-track traveling apparatus 3, respectively, makes contact with the stator core 5 while being pressed to the stator core 5. When in this situation, the motor 36 is driven, each of the crawler belts 21 and 31 travels while being folded at the respective outer circumferential surfaces of the driving-side pulley 33*a* and the driven-side pulley 33*b*, so that each of the crawler belts 21 and 31 can enter the electric power generator in the axle direction and can travel therein.

As is well known, the stator of the electric power generator has the stator core 5 configured with magnetic steel sheets, a coil 51 inserted into two or more slots formed at even intervals in the stator core 5, and a resin member 52 for pressing the coil 51.

Because due to attractive force of each of the permanent magnets 37*a*, 37*b*, and 37*c* that are attracted by the stator core 5, each of the crawler belts 21 and 31 is pressed to the stator core 5 and is driven while making contact with the stator core 5, the first endless-track traveling apparatus 2 and the second endless-track traveling apparatus 3 travel on the inner circumferential surface of the stator core 5 of the electric power generator. The traveling body 100 as an inspection robot for the electric power generator travels without straying away from the inner circumferential surface of the stator core 5 configured with magnetic steel sheets; then, the traveling body 100 travels while determining whether or not any abnormality exists in the electric power generator, by use of the sensor or the like mounted in the sensor mounting unit 1. In this situation, the traveling direction is adjusted by the difference between the respective speeds of the crawler belts 21 and 31 of the first endless-track traveling apparatus 2 and the second endless-track traveling apparatus 3, respectively, so that the traveling body 100 travels while performing rectilinear correction.

No attractive force to be produced by each of the permanent magnets 37a, 37b, and 37c occurs on the resin member 52 inserted into the slot of the stator core 5; therefore, when the first endless-track traveling apparatus 2 and the second endless-track traveling apparatus 3 of the traveling body 100 travel on the stator core 5 configured with magnetic steel sheets, they can travel without dropping from the stator. It may be allowed that in order to facilitate the travel of each of the first endless-track traveling apparatus 2 and the second endless-track traveling apparatus 3, a guide member is mounted on the protrusion portion of the stator core 5 of the electric power generator so that there is provided a mechanism for preventing the traveling body 100 from dropping from the stator core 5.

In such a way as described above, the inspection on the electric power generator is performed by making the traveling body 100 travel in the axle direction of the electric power generator; when the travel in the axle direction of the electric power generator ends, the traveling body 100 is pulled out from the electric power generator and the circumferential position in the electric power generator is changed; then, the traveling body 100 is made to travel in the axle direction of the electric power generator. In such a way as described above, the inspection by means of the traveling body 100 is performed over the all circumference of the electric power generator.

Figure 4:
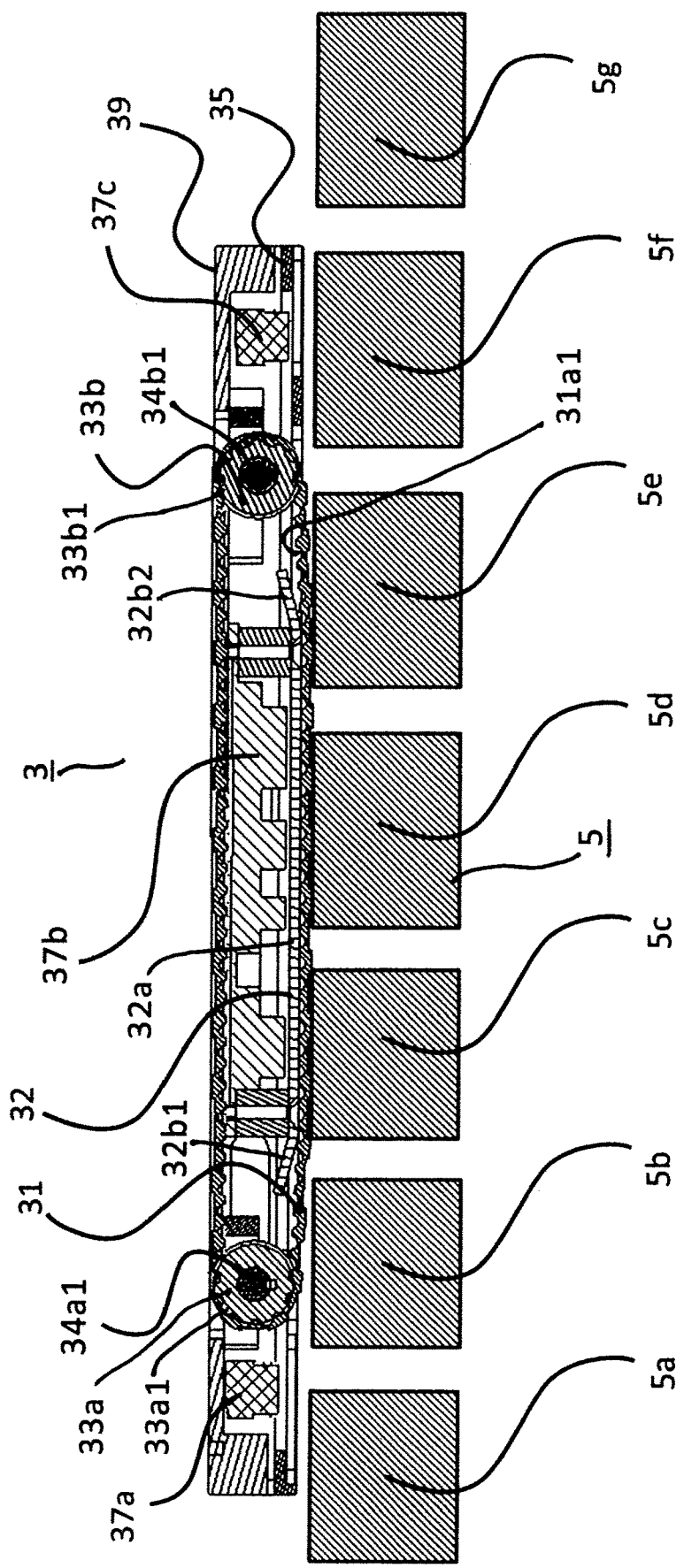
FIG. 4 is a cross-sectional view of the endless-track traveling apparatus according to Embodiment 1 of the present invention at a time when it travels.
Figure 6:
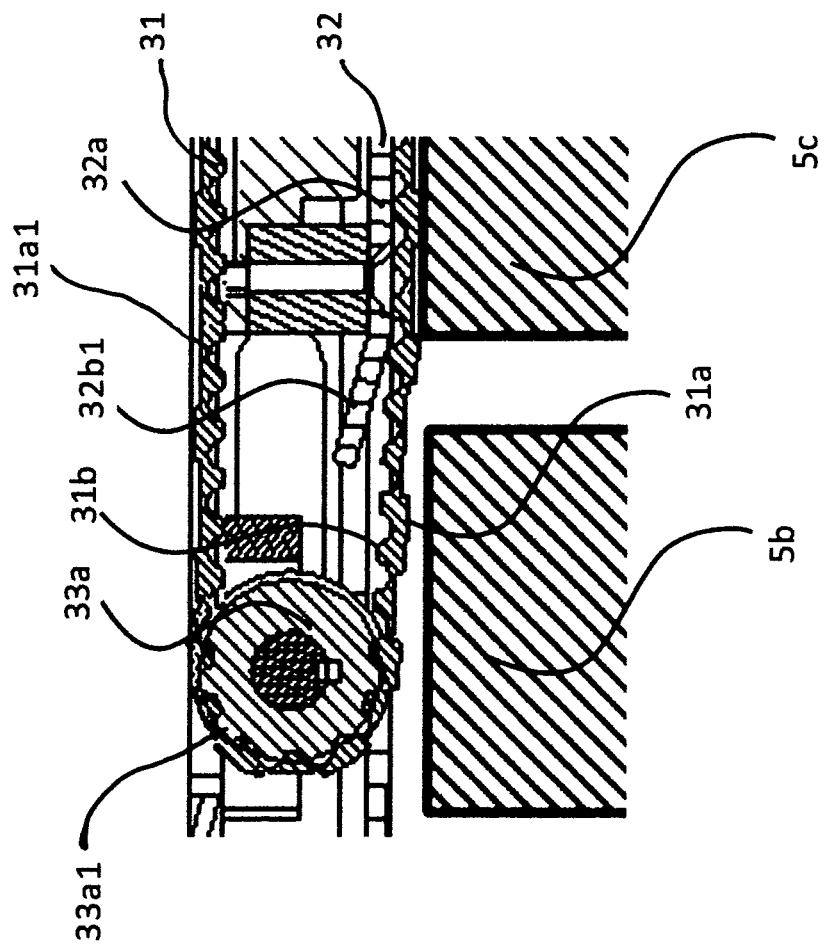
FIG. 6 is a partial cross-sectional view of the endless-track traveling apparatus according to Embodiment 1 of the present invention at a time when it travels.

FIG. 4 is a cross-sectional view of the endless-track traveling apparatus according to Embodiment 1 of the present invention at a time when it travels; FIG. 4 illustrates a traveling-direction cross section of the second endless-track traveling apparatus 3. FIG. 6 is a partial cross-sectional view of the endless-track traveling apparatus according to Embodiment 1 of the present invention at a time when it travels. As illustrated in each of FIGS. 4 and 6, with regard to the stator core 5, configured with magnetic steel sheets, of the electric power generator, two or more magnetic protrusion portions 5a, 5b, 5c, 5d, 5e, 5f, and 5g exist at even intervals in the stator core 5 in the axle direction, when described in detail; respective cooling spaces are formed between the magnetic protrusion portions 5a, 5b, 5c, 5d, 53, 5f, and 5g. The respective magnetic protrusion portions 5a, 5b, 5c, 5d, 5e, 5f, and 5g are arranged continuously and at predetermined intervals in the stator core in the axle direction; although the radial-direction height of the stator core is one and the same, there exist portions whose axle-direction widths are different from one another.

In order to make the traveling body 100 travel in the electric power generator configured in such a way as described above, it is required that the traveling body 100 travels in such a way that the first endless-track traveling apparatus 2 and the second endless-track traveling apparatus 3 are prevented from being trapped by the respective spaces existing between the magnetic protrusion portions 5a, 5b, 5c, 5d, 5e, 5f, and 5g. Therefore, as described above, in the endless-track traveling apparatus according to Embodiment 1 of the present invention, the flat portion 32a of the planar member 32 presses the crawler belt 31, from the inside to the outside thereof, to the traveling surface. Because of this configuration, the inner circumferential surface of the crawler belt 31 makes contact with the flat portion 32a of the planar member 32 in the range of the length dimension of the flat portion 32a of the planar member 32.

In this situation, the length dimension of the flat portion 32a of the planar member 32 has a magnitude that covers at least three adjacent magnetic protrusion portions among the magnetic protrusion portions 5a, 5b, 5c, 5d, 5e, 5f, and 5g existing side by side in the axle direction on the inner circumferential surface of the stator core 5. Accordingly, because the crawler belt 31 makes parallel contact with the surface of the stator core 5 at three or more points, the endless-track traveling apparatus can be downsized and can travel stably.

It may be also allowed that other three or more pulleys are arranged between the driving-side pulley 33a and the driven-side pulley 33b inside the crawler belt 31 so that the inside of the crawler belt 31 is held by the three or more pulleys; however, in that case, it is required to enlarge the diameter of the pulley or to provide a great number of pulleys in consideration of the case where the size of each of the respective cooling spaces existing between the magnetic protrusion portions 5a, 5b, 5c, 5d, 5e, 5f, and 5g is larger than the size of a single pulley. As a result, it becomes difficult to dispose the control board 38 or the endless-track traveling apparatus is upsized because the thickness or the overall length thereof becomes larger.

When the thicknesses of the first endless-track traveling apparatus 2 and the second endless-track traveling apparatus 3 increase, it may become impossible to insert the traveling body 100 into the space between the rotor 6 and the stator core 5 of the electric power generator; moreover, when the thicknesses of the first endless-track traveling apparatus 2 and the second endless-track traveling apparatus 3 increase, interference with the retaining ring of the electric power generator may occur at the position where the traveling body 100 is inserted into the electric power generator and hence it becomes impossible to insert the traveling body 100 into the electric power generator; therefore, it becomes impossible to perform inspection on the electric power generator.

As described above, the traveling body according to Embodiment 1 of the present invention makes it possible to downsize and thin the first endless-track traveling apparatus 2 and the second endless-track traveling apparatus 3; moreover, the endless-track traveling apparatuses are not trapped in the space in the traveling surface so as to become unable to travel and hence the endless-track traveling apparatuses can travel stably; therefore, detection of an abnormality or the like by the sensor does not become impossible.

Meanwhile, it is conceivable that in order to prevent the travel from becoming difficult due to friction or hooking between the crawler belt 31 and the planar member 32, the output torque of the motor 36 is increased; however, in order to increase the output torque of the motor 36, the motor 36 should be upsized. As a result, the endless-track traveling apparatus is upsized.

Accordingly, in the endless-track traveling apparatus according to Embodiment 1 of the present invention, in order to prevent the crawler belt 31 from becoming difficult to travel due to friction between the crawler belt 31 and the planar member 32, coating processing for decreasing the friction coefficient is applied to the surface, of the flat portion 32a of the planar member 32, that makes contact with the crawler belt 31. As a result, the friction resistance between the crawler belt 31 and the flat portion 32a of the planar member 32 is suppressed and hence the travel of the crawler belt 31 is facilitated, so that it is made possible to downsize the endless-track traveling apparatus without upsizing the motor. It may be allowed that instead of applying the coating processing to the flat portion 32a, a sheet formed of a low-friction material is pasted on the surface, of the flat portion 32a, that makes contact with the crawler belt 31

Furthermore, two or more teeth for transferring torque are provided in each of the outer circumferential surfaces 33a1 and 33b1 of the driving-side pulley 33a and the driven-side pulley 33b, respectively, and recess portions 31a1 for engaging with these teeth are provided in the crawler belt 31; however, in some cases, the recess portion 31a1 of the crawler belt 31 is hooked to the end portion of the planar member 32 and hence the travel of the crawler belt 31 becomes difficult.

Therefore, in the endless-track traveling apparatus according to Embodiment 1 of the present invention, the first inclination portion 32b1 and the second inclination portion 32b2 that gradually part from the crawler belt 31 are formed at both the respective end portions of the planar member 32. This configuration makes it possible to prevent the recess portion 31a1 of the crawler belt 31 from being hooked to the end portion of the planar member 32 and hence the travel of the crawler belt 31 is facilitated, so that it is made possible to downsize the endless-track traveling apparatus without upsizing the motor. It may be allowed that the foregoing coating processing is applied to at least each of the surfaces, of the first inclination portion 32b1 and the second inclination portion 32b2, that face the crawler belt 31 or the sheet formed of a low-friction material is pasted thereon.

It is required that in order to prevent slipping, the friction coefficient of the surface, of the crawler belt 31, that makes contact with the traveling surface is made large. In contrast, the surface, of the crawler belt 31, at the side where the engagement with the teeth provided in the driving-side pulley 33a and the driven-side pulley 33b is implemented requires a high strength so that stable engagement with the teeth is performed. Thus, in the endless-track traveling apparatus according to according to Embodiment 1 of the present invention, the hardness of the rubber, of the crawler belt 31, at the side where contact with the traveling surface is implemented is made low so that the friction coefficient is increased, and the hardness of the rubber, of the crawler belt 31, at the side where the engagement with the teeth provided in the driving-side pulley 33a and the driven-side pulley 33b is implemented is made high, so that the foregoing stable engagement is performed.

In the foregoing explanation, the second endless-track traveling apparatus 3 illustrated in FIG. 1 has mainly be described; however, the first endless-track traveling apparatus 2 is formed in the same manner.

As described above, in the endless-track traveling apparatus according to Embodiment 1 of the present invention, the size of the motor is not enlarged; thus, the endless-track traveling apparatus can be thinned and downsized. Thus, the inspection robot as a traveling body equipped with the endless-track traveling apparatus can perform stable travel even for the cooling groove in the stator core of the electric power generator, and the motor size does not become large; therefore, the robot becomes thin and small-size.

Embodiment 2

Figure 7:
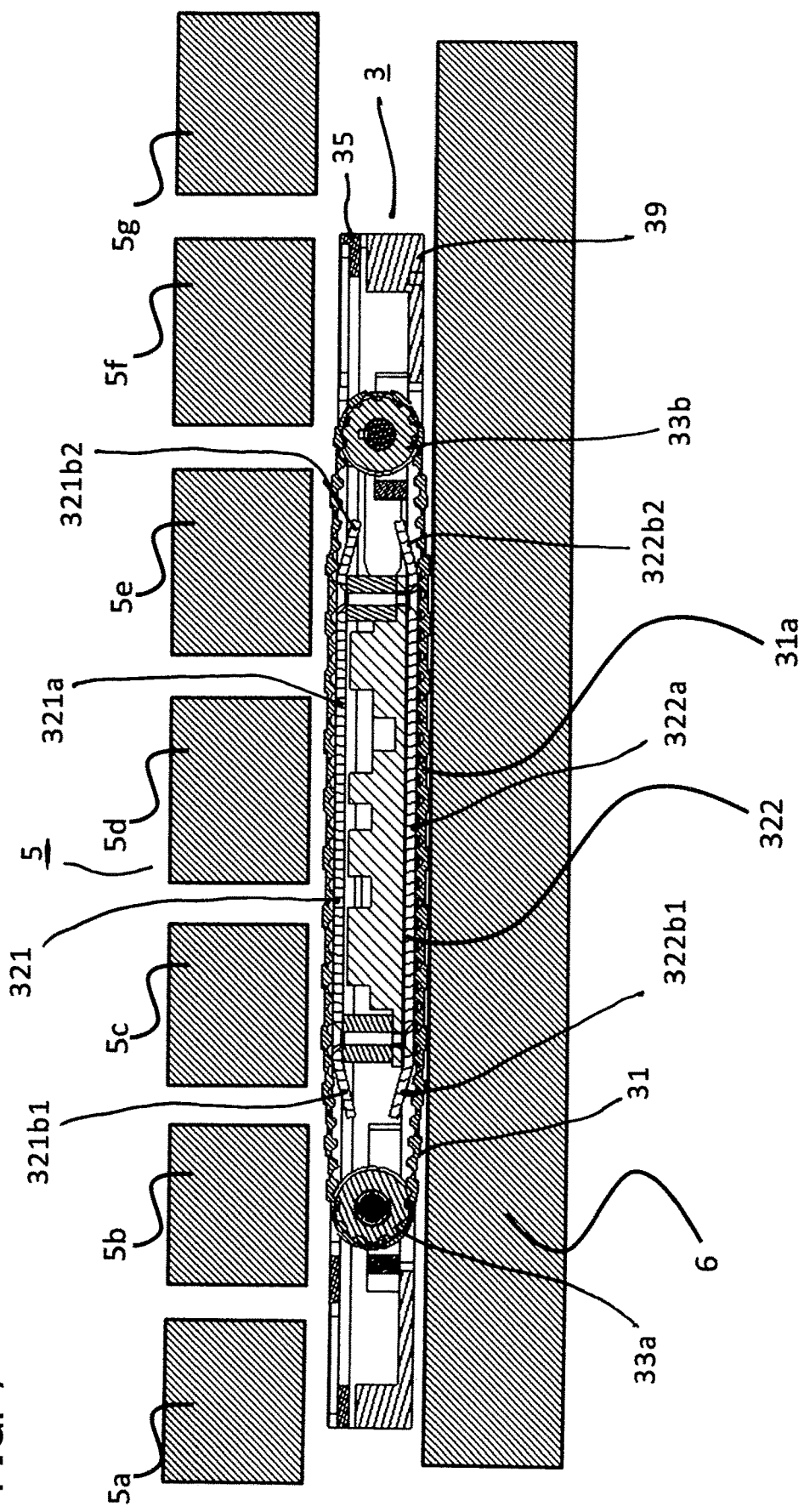
FIG. 7 is a cross-sectional view of an endless-track traveling apparatus according to Embodiment 2 of the present invention at a time when it travels.

FIG. 7 is a cross-sectional view of an endless-track traveling apparatus according to Embodiment 2 of the present invention at a time when it travels. In FIG. 7, the stator core 5 of an electric power generator is situated at the upper side of the drawing; the rotor 6 is situated at the lower side of the drawing. The endless-track traveling apparatus according to Embodiment 2 of the present invention is provided with a first planar member 321 and a second planar member 322 that are each formed in the same manner as the planar member in the endless-track traveling apparatus according to foregoing Embodiment 1.

In FIG. 7, with the crawler belt 31 in contact with the surface of the rotor 6 of the electric power generator, the second endless-track traveling apparatus 3 travels in the axle direction of the electric power generator. The first planar member 321 corresponds to the planar member 32 in the endless-track traveling apparatus 3 according to Embodiment 1 and is provided at the side, in the crawler belt 31, that faces the stator core 5 of the electric power generator. The second planar member 322 is provided at the side, in the crawler belt 31, that faces the rotor 6 of the electric power generator.

In each of FIG. 7 and foregoing FIG. 5, the first planar member 321 has a flat portion 321a that makes contact with the inner circumferential surface of one of the two portions (the upper portion in FIG. 7), of the crawler belt 31 existing between the driving-side pulley 33a and the driven-side pulley 33b, that face each other.

The flat portion 321a of the first planar member 321 makes contact with the inner circumferential surface of the crawler belt 31 at a position at the traveling subject 5 side with respect to the virtual straight line X1 that connects the vertex A1, at the traveling subject 5 (e.g., a traveling surface) side, in the outer circumferential surface 33a1 of the driving-side pulley 33a and the vertex B1, at the traveling subject 5 side, in the outer circumferential surface 33b1 of the driven-side pulley 33b. Accordingly, the crawler belt 31 is pressed from the inside to the outside by the first planar member 321 and is exposed to the outside through the through-hole 351 provided in the covering portion 35 so as to make contact with the traveling subject 5.

The first planar member 321 disposed inside the crawler belt 31 is provided with the flat portion 321a that makes contact with the inner circumferential surface of the driving-side pulley 33a, a first inclination portion 321b1 connected with one of the end portions of the flat portion 321a, and a second inclination portion 321b2 connected with the other one of the end portions of the flat portion 321a. The first inclination portion 321b1 is formed in such a way that the distance between the first inclination portion 321b1 and the inner circumferential surface of the crawler belt 31 becomes larger as the first inclination portion 321b1 approaches the driving-side pulley 33a more. The second inclination portion 321b2 is formed in such a way that the distance between the second inclination portion 321b2 and the inner circumferential surface of the crawler belt 31 becomes larger as the second inclination portion 321b2 approaches the driven-side pulley 33b more.

The second planar member 322 has a flat portion 322a that makes contact with the inner circumferential surface of the other one of the two portions (the lower portion in FIG. 7, the upper portion of FIG. 5), of the crawler belt 31 existing between the driving-side pulley 33a and the driven-side pulley 33b, that face each other.

The flat portion 322a of the second planar member 322 makes contact with the inner circumferential surface of the crawler belt 31 at a position at a traveling subject 6 side with respect to a virtual straight line X2 that connects a vertex A2, at the traveling subject (e.g., a traveling surface) side, in the outer circumferential surface 33a1 of the driving-side pulley 33a and a vertex B2, at the traveling subject 6 side, in the outer circumferential surface 33b1 of the driven-side pulley 33b. Accordingly, the crawler belt 31 is pressed from the inside to the outside by the second planar member 322 and is exposed to the outside through the through-hole 396 provided in the base portion 39 so as to make contact with the traveling subject 5.

The second planar member 322 disposed inside the crawler belt 31 is provided with the flat portion 322a that makes contact with the inner circumferential surface of the driving-side pulley 33a, a first inclination portion 322b1 connected with one of the end portions of the flat portion 322a, and a second inclination portion 322b2 connected with the other one of the end portions of the flat portion 322a. The first inclination portion 322b1 is formed in such a way that the distance between the first inclination portion 322b1 and the inner circumferential surface of the crawler belt 31 becomes larger as the first inclination portion 322b1 approaches the driving-side pulley 33a more. The second inclination portion 322b2 is formed in such a way that the distance between the second inclination portion 322b2 and the inner circumferential surface of the crawler belt 31 becomes larger as the second inclination portion 322b2 approaches the driven-side pulley 33b more.

The endless-track traveling apparatus according to Embodiment 2 of the present invention configured in such a manner as described above is utilized, for example, as illustrated in foregoing FIG. 1, as one of a pair of endless-track traveling apparatuses of the traveling body 100 configured as an inspection robot for an electric power generator.

Even in the case where while, as Embodiment 1, traveling on the inner circumferential surface of the stator core 5 of the electric power generator, the traveling body according to Embodiment 2 of the present invention drops, for some causes, from the inner circumferential surface of the stator core 5 to the outer circumferential surface of the rotor 6, the crawler belt 31 can travel on the surface of the rotor 6, because the second planar member 322 is provided at the side, of the crawler belt 31, that faces the rotor 6 and hence the crawler belt 31 protrudes toward the rotor 6 through the through-hole 392 of the base portion 39.

Accordingly, when the endless-track traveling apparatus according to Embodiment 2 is utilized as the traveling apparatus of a traveling body configured as an inspection robot for an electric power generator, the traveling body can travel on the surface of the rotor even when a failure such as dropping from the stator core occurs; on top of that, a thin and small-size traveling body can be obtained.

In the endless-track traveling apparatus according to Embodiment 2 of the present invention, the respective crawler belts protrude at one and the other one of the surfaces that are in a front-and-back relation; therefore, there can be obtained not only a traveling body as an inspection robot for an electric power generator but also a traveling body that can travel in a narrow place while performing switching between the front surface and the back surface of the endless-track traveling apparatus.

In the endless-track traveling apparatus 3, illustrated in FIG. 6, according to Embodiment 2 of the present invention, the respective crawler belts protrude at one and the other one of the surfaces that are in a front-and-back relation; however, it may be allowed that the first planar member 321 and the second planar member 322 are integrally fixed to each other and that a switching apparatus is provided for switching the respective setting positions of the first planar member 321 and the second planar member 322 so that the crawler belt 31 protrudes through only one of the surfaces, as may be necessary. Alternatively, it may be allowed to provide a switching apparatus for switching the setting positions of each of the first planar member 321 and the second planar member 322.

In the endless-track traveling apparatus according to Embodiment 2 of the present invention, each of the first planar member 321 and the second planar member 322 is configured in the same manner as the planar member 32 in the endless-track traveling apparatus according to Embodiment 1; the crawler belt 31 in the endless-track traveling apparatus according to Embodiment 2 is configured in the same manner as the crawler belt 31 in the endless-track traveling apparatus according to Embodiment 1.

The present invention is not limited to the endless-track traveling apparatus according to any one of foregoing Embodiments 1 and 2; in the scope within the spirits of the present invention, the configurations of Embodiments 1 and 2 can appropriately be combined with each other, can partially be modified, or can partially be omitted.

INDUSTRIAL APPLICABILITY

The present invention can be applied to the field of various kinds of robots as traveling bodies, for example, to the field of an inspection robot for an electric power generator, a traveling body that travels in a narrow place, or the like.

DESCRIPTION OF REFERENCE NUMERALS

100: traveling body
1: sensor mounting unit
2: 1st endless-track traveling apparatus
3: 2nd endless-track traveling apparatus
31: crawler belt
411, 412, 421, 422, 431, 432: coupling member
39: base portion
391, 392, 393, 394: side portion
395: top portion
33a: driving-side pulley
33b: driven-side pulley
32: planar member
321: 1st planar member
322: 2nd planar member
32a, 321a, 322a: flat portion
32b1, 321b1, 322b1: 1st inclination portion
32b2, 321b2, 322b2: 2nd inclination portion
37a, 37b, 37c: permanent magnet
34a: driving-side pulley axle unit
34a1: driving-side pulley axle
34a2: driving-side pulley axle holding body
34a3, 34a4: bevel gear
34b: driven-side pulley axle unit
34b1: driven-side pulley axle
34b2: driven-side pulley axle holding body
35: covering portion
396, 351, 352, 353: through-hole

The invention claimed is:
1. A traveling body comprising:
a first endless-track traveling apparatus and a second endless-track traveling apparatus that are arranged in parallel with each other in a direction perpendicular to a traveling direction wherein the first endless-track traveling apparatus and the second endless-track traveling apparatus each include, a first pulley and a second pulley that are arranged in such a way that the respective center axes thereof are in parallel with each other, a motor that drives at least one of the first pulley and the second pulley; and an endless track that is wound over an outer circumferential surface of the first pulley and an outer circumferential surface of the second pulley, that is driven by the at least one of the pulleys rotated by being driven by the motor, and that travels over the first pulley and the second pulley, wherein an outer circumferential surface of the endless track makes contact with a traveling subject so that based on the travel of the endless track, the endless-track traveling apparatus travels on the traveling subject, wherein there is provided a planar member that is disposed in a space surrounded by the endless track and has a flat portion that is configured to press from the inside and make contact with an inner circumferential surface of at least one of two portions of the endless track existing between the first pulley and the second pulley, that face each other, wherein the flat portion of the planar member makes contact with the inner circumferential surface of the endless track at a position on a traveling subject side with respect to a virtual straight line that connects a vertex, on the traveling subject side, in the outer circumferential surface of the first pulley and a vertex, on the traveling subject side, in the outer circumferential surface of the second pulley, and wherein at least part of the outer circumferential surface of the endless track, that is opposite the inner circumferential surface in contact with the flat portion of the planar member, makes contact with the traveling subject;

an apparatus mounting unit that is disposed between the first endless-track traveling apparatus and the second endless-track traveling apparatus and is equipped with an inspection apparatus; and a coupling member that couples the apparatus mounting unit with each one of the first endless-track traveling apparatus and the second endless-track traveling apparatus, wherein each coupling member is configured to bend at a substantially central portion in its longitudinal direction.

2. The traveling body according to claim 1, wherein the friction coefficient between the inner circumferential surface of the endless track and the flat portion of the planar member is set to be smaller than the friction coefficient between the endless track and the outer circumferential surface of the at least one of the pulleys driven by the motor.

3. The traveling body according to claim 2, further including an inclination portion connected with an end portion of the flat portion of the planar member, wherein the inclination portion is formed in such a way that the distance between the inclination portion and the inner circumferential surface of the endless track becomes larger as the inclination portion approaches the pulley more.

4. The traveling body according to claim 3, wherein the endless track is formed in such a way that the hardness of the inner circumferential surface is larger than the hardness of the outer circumferential surface.

5. The traveling body according to claim 2, wherein the endless track is formed in such a way that the hardness of the inner circumferential surface is larger than the hardness of the outer circumferential surface.

6. The traveling body according to claim 1, further including an inclination portion connected with an end portion of the flat portion of the planar member, wherein the inclination portion is formed in such a way that the distance between the inclination portion and the inner circumferential surface of the endless track becomes larger as the inclination portion approaches the pulley.

7. The traveling body according to claim 6, wherein the endless track is formed in such a way that the hardness of the inner circumferential surface is larger than the hardness of the outer circumferential surface.

8. The traveling body according to claim 1, wherein the endless track is formed in such a way that the hardness of the inner circumferential surface is larger than the hardness of the outer circumferential surface.

9. The traveling body according to claim 1, comprising: magnets for providing an attractive force to the traveling subject.

10. A traveling body comprising:

a first endless-track traveling apparatus and a second endless-track traveling apparatus that are arranged in parallel with each other in a direction perpendicular to a traveling direction wherein the first endless-track traveling apparatus and the second endless-track traveling apparatus each include, a first pulley and a second pulley that are arranged in such a way that the respective center axes thereof are in parallel with each other, a motor that drives at least one of the first pulley and the second pulley; and an endless track that is wound over an outer circumferential surface of the first pulley and an outer circumferential surface of the second pulley, that is driven by the at least one of the pulleys rotated by being driven by the motor, and that travels over the first pulley and the second pulley, wherein an outer circumferential surface of the endless track makes contact with a traveling subject so that based on the travel of the endless track, the endless-track traveling apparatus travels on the traveling subject, a first planar member that is disposed in a space surrounded by the endless track and has a flat portion that makes contact with an inner circumferential surface of one of two portions of the endless track that face each other and that are arranged between the first pulley and the second pulley, a second planar member that is disposed in the space surrounded by the endless track and has a flat portion that makes contact with an inner circumferential surface of the other one of two portions of the endless track existing between the first pulley and the second pulley, that face each other, wherein the flat portion of the first planar member is configured to press from the inside and make contact with the inner circumferential surface of the one of two portions of the endless track at a position apart from a virtual straight line, in a direction departing from the space surrounded by the endless track, that connects a vertex, at the side of the one of two portions of the endless track, in the outer circumferential surface of the first pulley and a vertex, at the side of the one of two portions of the endless track, in the outer circumferential surface of the second pulley, wherein the flat portion of the second planar member makes contact with the inner circumferential surface of the other one of two portions of the endless track at a position apart from a virtual straight line, in a direction departing from the space surrounded by the endless track, that connects a vertex, at the side of the other one of two portions of the endless track, in the outer circumferential surface of the first pulley and a vertex, at the side of the other one of two portions of the endless track, in the outer circumferential surface of the second pulley, and wherein the endless track is configured in such a way that the traveling subject makes contact with at least part of the outer circumferential surface that is opposite the inner circumferential surface in contact with the flat portion of the first planar member, of the one of two portions of the endless track and at least part of the outer circumferential surface that faces the inner circumferential surface, being in contact with the flat portion of the second planar member, of the other one of two portions of the endless track;

an apparatus mounting unit that is disposed between the first endless-track traveling apparatus and the second endless-track traveling apparatus and is equipped with an inspection apparatus; and a coupling member that couples the apparatus mounting unit with each one of the first endless-track traveling apparatus and the second endless-track traveling apparatus, wherein each coupling member is configured to bend at a substantially central portion in its longitudinal direction.

11. The traveling body according to claim 10, further including a control board equipped with a control circuit for controlling the motor, wherein the control board is disposed between the first planar member and the second planar member.

* * * * *